US008713777B1

(12) United States Patent
Scott

(10) Patent No.: US 8,713,777 B1

(45) Date of Patent: May 6, 2014

(54) PISTON PIN PULLER ADAPTOR TOOL

(75) Inventor: Steven Richard Scott, Belmont, CA (US)

(73) Assignee: Motion Pro, Inc., San Carlos, CA (US)

( * ) Notice: Subject to any disclaimer, the term of this patent is extended or adjusted under 35 U.S.C. 154(b) by 278 days.

(21) Appl. No.: 12/837,436

(22) Filed: Jul. 15, 2010

Related U.S. Application Data

(60) Provisional application No. 61/229,841, filed on Jul. 30, 2009.

(51) Int. Cl.

| | |
|---|---|
| ***B23Q 1/00*** | (2006.01) |
| ***B23Q 3/00*** | (2006.01) |
| ***B23P 19/04*** | (2006.01) |
| ***B25B 27/00*** | (2006.01) |
| ***B25B 27/14*** | (2006.01) |

(52) U.S. Cl.
USPC .................... 29/283; 29/255; 29/270; 29/280

(58) Field of Classification Search
USPC ........... 29/255, 270, 271, 265, 278, 263, 280, 29/888.04; 81/124.2
See application file for complete search history.

(56) References Cited

U.S. PATENT DOCUMENTS 1,841,190 A * 1/1932 Justiss ............................. 29/263
3,031,744 A * 5/1962 Stein ............................... 29/283
3,050,840 A * 8/1962 Dunkerley ...................... 29/263
6,507,985 B1 * 1/2003 Loughlin et al. ................ 29/229
6,789,313 B2 * 9/2004 Hendricks .................. 29/888.04
6,823,574 B2 * 11/2004 Swanson ......................... 29/264
7,980,604 B2 * 7/2011 Punaro ............................ 29/270
2006/0070221 A1 * 4/2006 Wridt et al. .................. 29/281.1

OTHER PUBLICATIONS

"Pull." Def. 2. Macmillandictionary.com. Macmillan Publishers, n.d. Web. <http://www.macmillandictionary.com/dictionary/american/pull>.*

"Interface" Def. 6. collinsdictionary.com. <http://www.collinsdictionary.com/dictionary/english/interface>.*

"Interface" macmillandictionary.com. <http://www.macmillandictionary.com/dictionary/american/interface_9>.*

* cited by examiner

*Primary Examiner* — Lee D Wilson

*Assistant Examiner* — Seahee Yoon

(74) *Attorney, Agent, or Firm* — Larry B. Guernsey; Patent Law Office of Larry Guernsey

(57) ABSTRACT

A piston pin puller adaptor tool, which includes a body, a puller screw attached to the body and a number of interchangeable adaptor sleeves, which attach to the body. The interchangeable adaptor sleeves include at least a short skirt adaptor sleeve and a full skirt adaptor sleeve. Also, an adaptor sleeve for use with a pin puller tool, which has been configured to interface with the contours of a short skirt piston.

7 Claims, 7 Drawing Sheets

PISTON PIN PULLER ADAPTOR TOOL

The following is a non-provisional patent application which claims priority to provisional application 61/229,841 filed Jul. 30, 2009 to the same inventor.

TECHNICAL FIELD

The present invention relates generally to tools for working on piston repair and more particularly to tools for detaching piston pins for removal of pistons.

BACKGROUND ART

Most internal combustion reciprocating engines use pistons as a means of providing motive power. The pistons are each located in a cylinder, and are made air-tight by piston rings. Its purpose is to transfer force from expanding gas in the cylinder to the crankshaft by piston rods or connecting rods. The head of the piston is exposed to repeated bursts from compressed ignited gasoline and air in the cylinder, and therefore become worn with time and periodically require replacement. The pistons are connected to the piston rods by piston pins, and when the pistons are to be removed, the pins are pulled to allow the piston to be removed and then replaced by new or refurbished pistons.

Pistons currently come in two main varieties, the "full skirt piston" and the "short skirt piston", also know as a "slipper piston". FIGS. 1-2 show isometric views of the full skirt piston 20 with the major elements indicated. The piston assembly 1 includes a rod 2, which is attached to the piston 3 by a pivot joint 4 using a pin 5 (shown in both figures as being partially drawn). The pin 5 seats in a socket 6, which extends through the piston 3 into the rod 2, and back into the piston 3. The exterior of the socket 6 is referred to as the piston pin boss 7. The piston 3 includes rings 8 which seat in ring lands 9. The full skirt 21 extends down over the pin boss 7 and a portion of the rod 2.

FIGS. 3-4 show isometric views of the short skirt piston 30 and FIG. 5 shows a cut-away of the short skirt piston 30 with the major elements indicated. The major elements are referred to by the same reference numbers as when referring to the full skirt piston above, where appropriate, so again, the piston assembly 1 includes a rod 2, which is attached to the piston 3 by a pivot joint 4 using a pin 5. The piston 3 includes rings 8 which seat in ring lands 9. The pin 5 seats in a socket 6, which is surrounded by piston pin boss 7. The short skirt 31 can be compared to the full skirt 21 of FIGS. 1-2. It can be seen that the short skirt 31 is shorter on the sides than the full skirt 21, and extends only to just below the ring lands 9 at the front and back near the pin boss 7. It can also be see that the pin 5 is hollow and includes a pin bore 12.

The cross-sectional view of the short skirt piston 30 in FIG. 5 shows the pin 5 partially withdrawn from the socket 6 within the pin boss 7. Clips 10 are held in clip grooves 11 which are fashioned in the pin boss 7. These clips 10 serve to help retain the pins 5 in the pin bosses 7, and must be removed in order to remove the pins 5. The ring lands 9 are showed with the rings 8 removed.

Short skirt pistons are being used more and more commonly as a means of reducing internal friction in the cylinder and to reduce weight, both of which increase engine performance.

As the piston becomes worn, the piston pin boss often becomes deformed and sometimes includes burrs or other formations that resist the extraction of the pins. Thus, a considerable amount of force may be required to draw the pin and to allow the piston to be removed. Therefore piston pin puller tools have been devised to forcibly draw the pins. Prior piston pin pullers are generally configured for working with the traditional full skirt piston, and are fashioned with a sleeve that has a full circular end-section. This works well with the full skirt piston, where the end of the sleeve easily abuts the side of the skirt portion surrounding the pin socket. However, when this configuration is used with a short skirt piston, most of this skirt area surrounding the pin socket has been removed so that a sleeve with a full circular end-section does not rest evenly on the side of the piston.

As seen in FIG. 6 (prior art), the full circular end 42 of the pin puller sleeve 40 thus rests mainly on the area including portions of the piston ring lands 9. This can cause a number of problems, including damage to the rings and ring lands. If the ring lands are damaged the piston cannot be reused.

Also, since the circular end 42 of the prior art sleeve 40 is supported only at a portion of its circumference, which includes the skirt 31, but not the piston pin boss 7, when force 50 is applied to draw the pin 5, the sleeve 40 tends to pivot at this support point, resulting in a rotational moment 51. The pin 5 is thus not retracted in a straight line, but tends to also pivot. This can cause damage to the pin 5, and can gall the pin socket 6 as well.

Thus, there is need for a pin puller with a sleeve that conforms to the contours of a short skirt piston. Further, there is a need for a pin puller that has interchangeable sleeves that can accommodate both full skirt pistons and short skirt pistons.

DISCLOSURE OF INVENTION

Briefly, one preferred embodiment of the present invention is a piston pin puller adaptor tool, which includes a body, a puller screw attached to the body and a number of interchangeable adaptor sleeves, which attach to the body. These interchangeable adaptor sleeves include at least a short skirt adaptor sleeve and a full skirt adaptor sleeve.

Also disclosed is an adaptor sleeve for use with a pin puller tool, which has been configured to interface with the contours of a short skirt piston.

An advantage of the present invention is that it is usable on both short skirt pistons and full skirt pistons.

Another advantage of the present invention is that it is usable on short skirt pistons without risking damage to the rings and ring lands.

A further advantage of the present invention is one tool includes replaceable sleeves, which are configured for both full skirt and short skirt pistons.

And another advantage of the present invention is that it includes a number of pin adaptors, which work with various sized pins Yet another advantage of the present invention is that it is can be less expensive than buying separate tools for full skirt and short skirt operations.

A further advantage of the present invention is that it minimizes the number of tools that a mechanic may have to keep in his kit.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

DETAILED DESCRIPTION OF THE PREFERRED EMBODIMENTS

The present invention is a pin puller adaptor tool, which will be referred to by the reference number 100, and thus shall be referred to as pin puller adaptor tool 100. A preferred embodiment of the pin puller adaptor tool 100 and its elements are illustrated in FIGS. 7-11.

As discussed above, as a piston becomes worn, the piston pin boss often become deformed and sometimes include burrs or other formations that resist the extraction of the pins. Thus, a considerable bit of force may be required to draw the pin and to allow the piston to be removed. Therefore piston pin pullers have been devised to forcibly draw the pins.

Prior piston pin pullers are generally configured for the traditional full skirt piston, and are fashioned with a sleeve that has a full circular end-section. This works well with the full skirt piston, where the end of the sleeve easily abuts the side of the skirt portion surrounding the pin hole. However, when this configuration is used with a short skirt piston, most of this skirt area surrounding the pin socket has been removed so that a sleeve with a full circular end-section does not rest evenly on the side of the piston.

Figure 6:
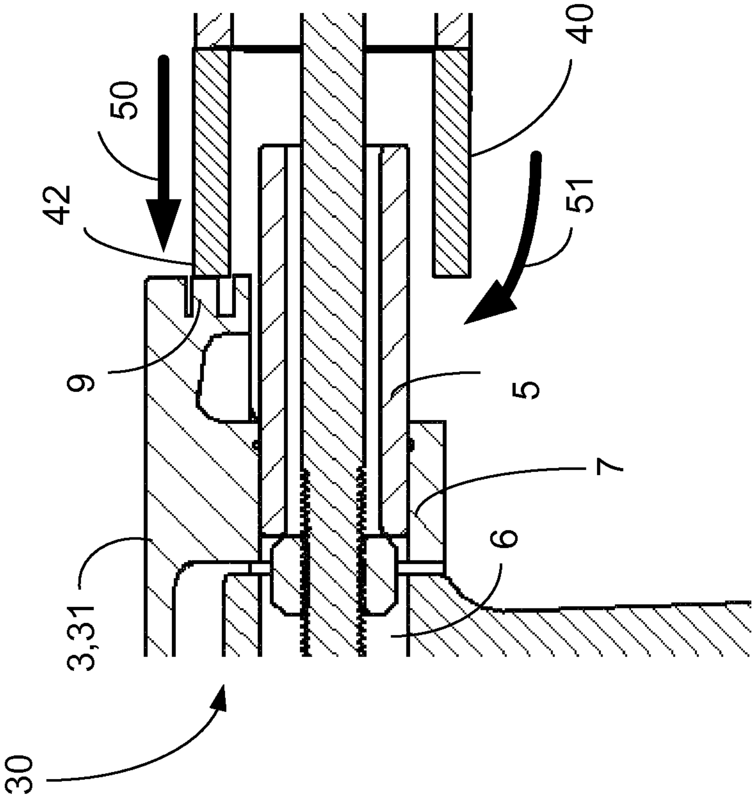
FIGURE 6 Prior art
FIG. 6 shows a cross-sectional detail view of a pin puller of the prior art used on a short skirt piston.

As seen in FIG. 6 (prior art), the full circular end of the pin puller sleeve 40 thus rests mainly on the area including portions of the piston ring lands 9. This can cause a number of problems, including damage to the rings and ring lands. If the ring lands are damaged the piston cannot be reused.

Also, since the end of the sleeve 40 is supported only at a portion of its circumference, which includes the skirt 31, but not the piston pin boss 7, when force 51 is applied to draw the pin 5, the sleeve 40 tends to pivot at this support point, resulting in a rotational moment 51, and the pin 5 is not retracted in a straight line, but tends to also pivot. This can cause damage to the pin 5, and can gall the pin socket 6 as well.

Figure 8:
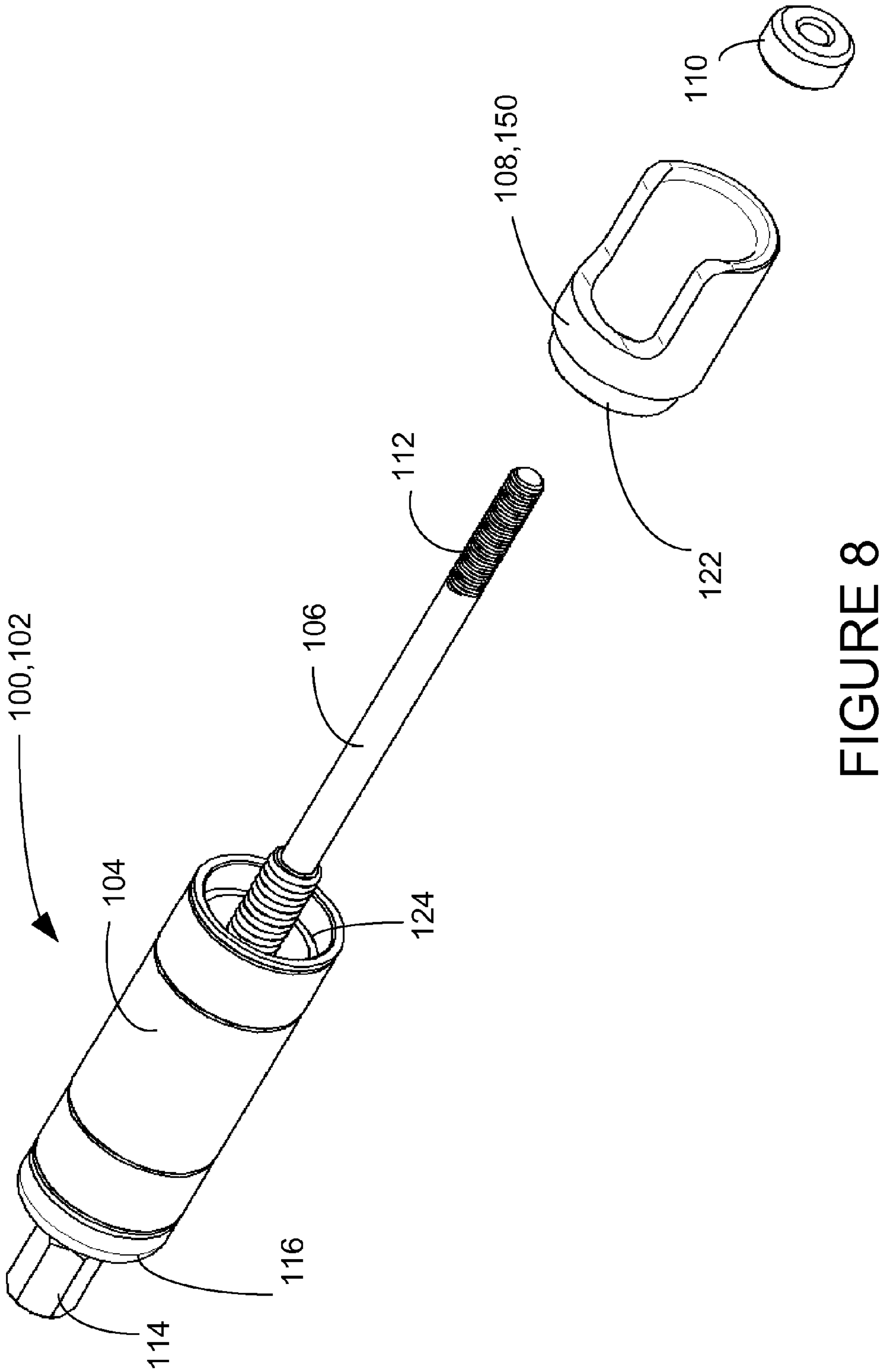
FIG. 8 shows an exploded isometric top view of the piston puller adaptor tool of the present invention with a short skirt adaptor sleeve.
Figure 9:
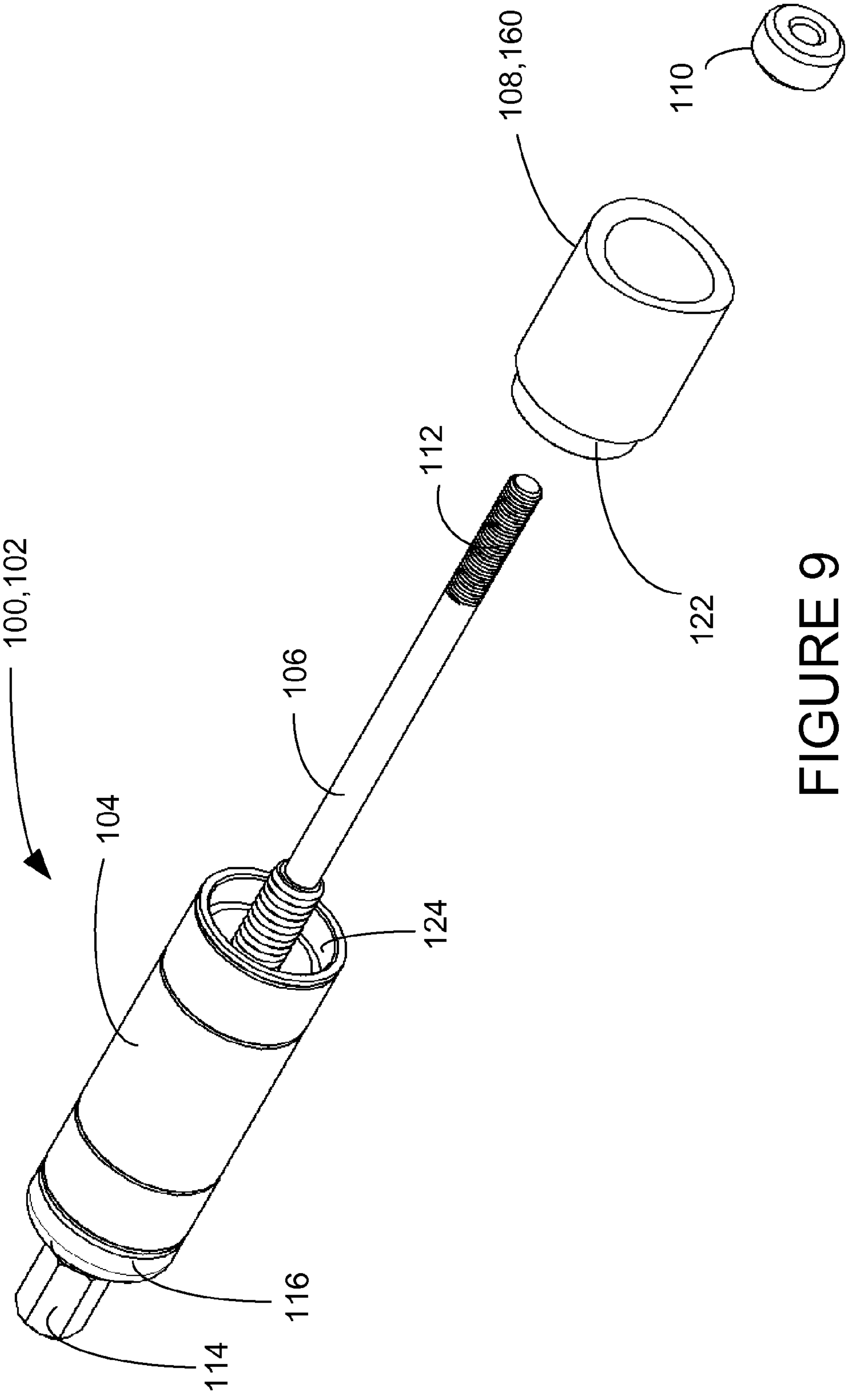
FIG. 9 shows an exploded isometric top view of the piston puller adaptor tool of the present invention with a full skirt adaptor sleeve.

In answer to these problems, the present pin puller adaptor tool 100 has been invented. FIGS. 7-11 show the present pin puller adaptor tool. Referring now particularly to FIGS. 8 and 9, the pin puller adaptor tool 100 with a short skirt adaptor sleeve 150 is shown in exploded view in FIG. 8, and FIG. 9 shows a full skirt adaptor sleeve 160 in exploded view. Both have an adaptor assembly 102, including a body 104, a puller screw 106, and an adaptor sleeve 108, of which there are two varieties, the short skirt adaptor sleeve 150 and the full skirt adaptor sleeve 160. There is also a puller screw adaptor 110, which screws onto threads 112 at the end of the puller screw 106. A nut 114 is provided at the other end of the puller screw 106, which is configured to be gripped and turned by a wrench or by hand. The body 104 includes an end plate 116, which includes female threads 118, through which male threads 120 on the puller screw 106 are mated (see FIGS. 10 and 11). It is noted that in the present embodiment as shown, the end plate 116 and the body 104, is actually composed of two separate parts which are pressed together. However, this is not to be taken as a limitation, and it is presently preferred that the body 104 and the end plate 116 be a single unitary member.

Figure 2:
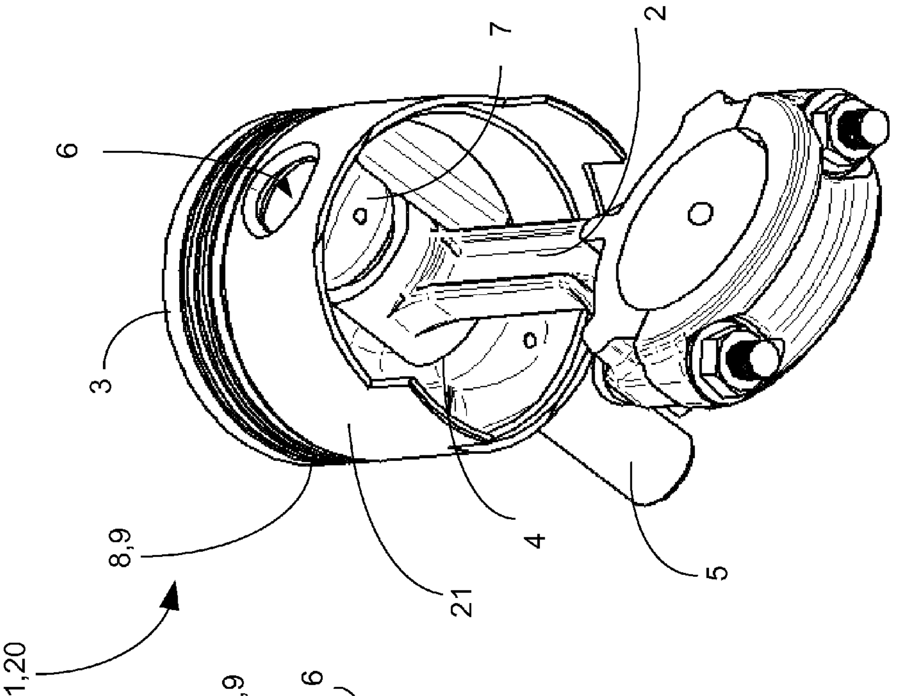
FIGS. 1-2 show isometric views of a full skirt piston.
Figure 1:
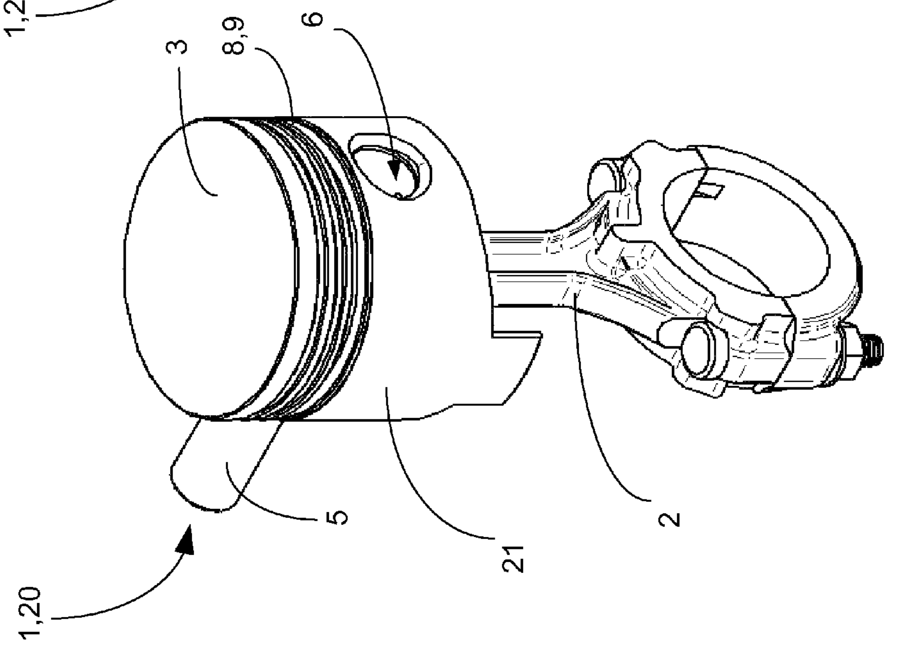
Figure 3:
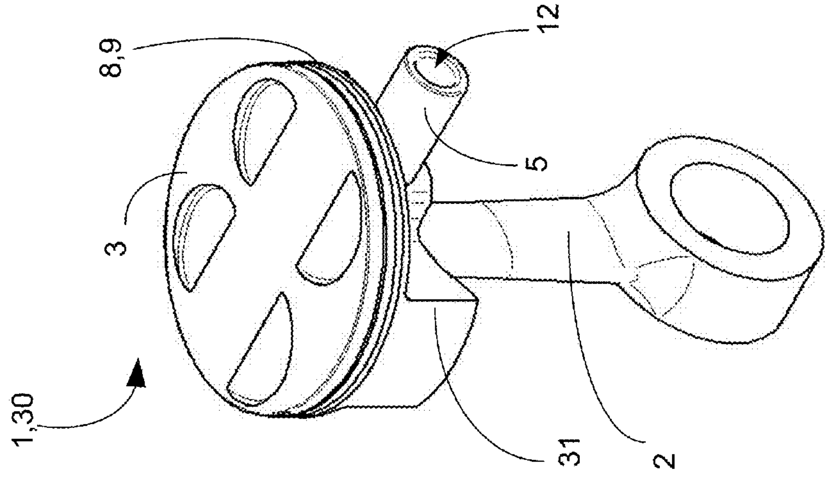
FIGS. 3-4 show isometric views of a short skirt piston.
Figure 4:
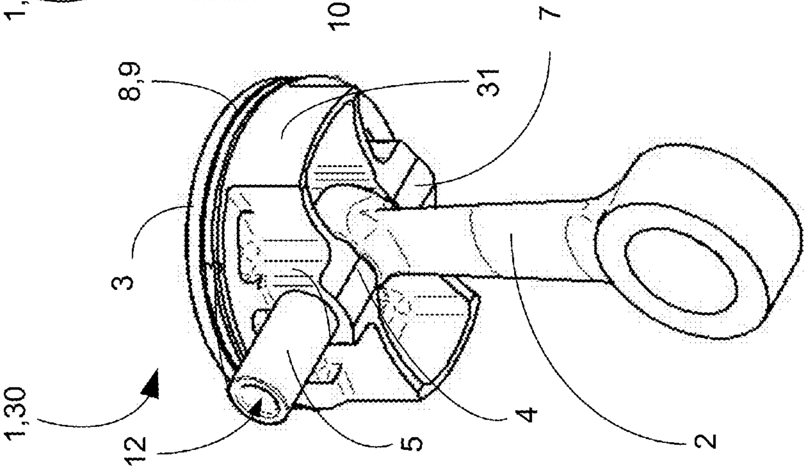
Figure 5:
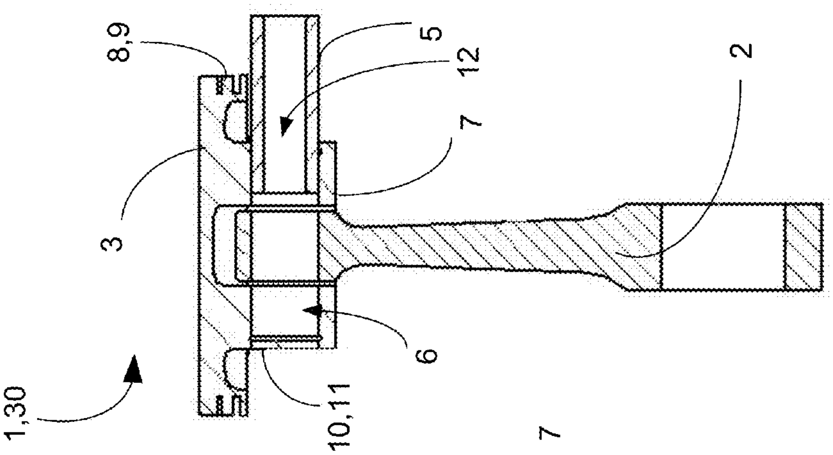
FIG. 5 shows a cross-sectional view of a short skirt piston.
Figure 7:
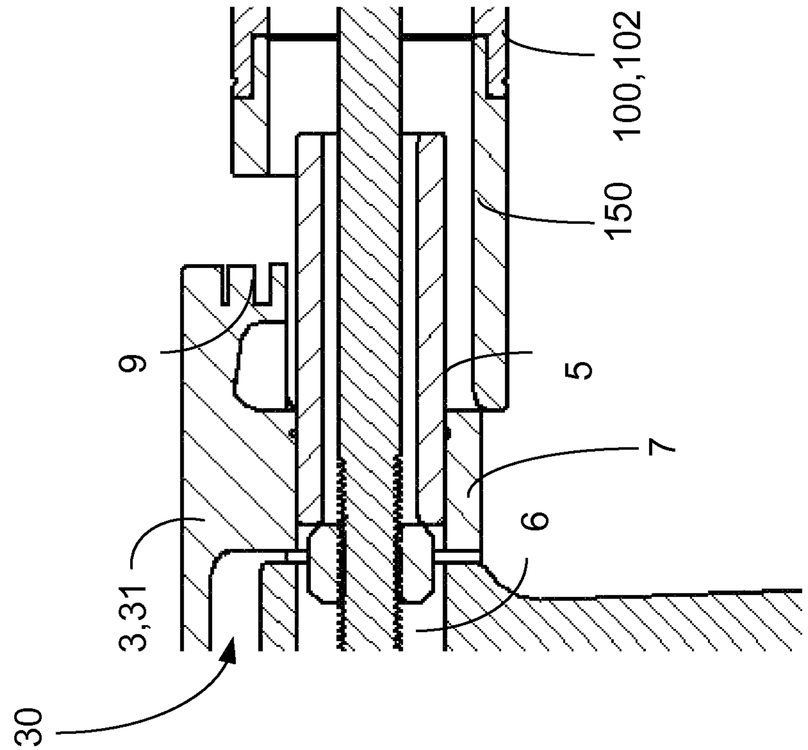
FIG. 7 shows a cross-sectional detail view of a pin puller of the present invention used on a short skirt piston.
Figure 10:
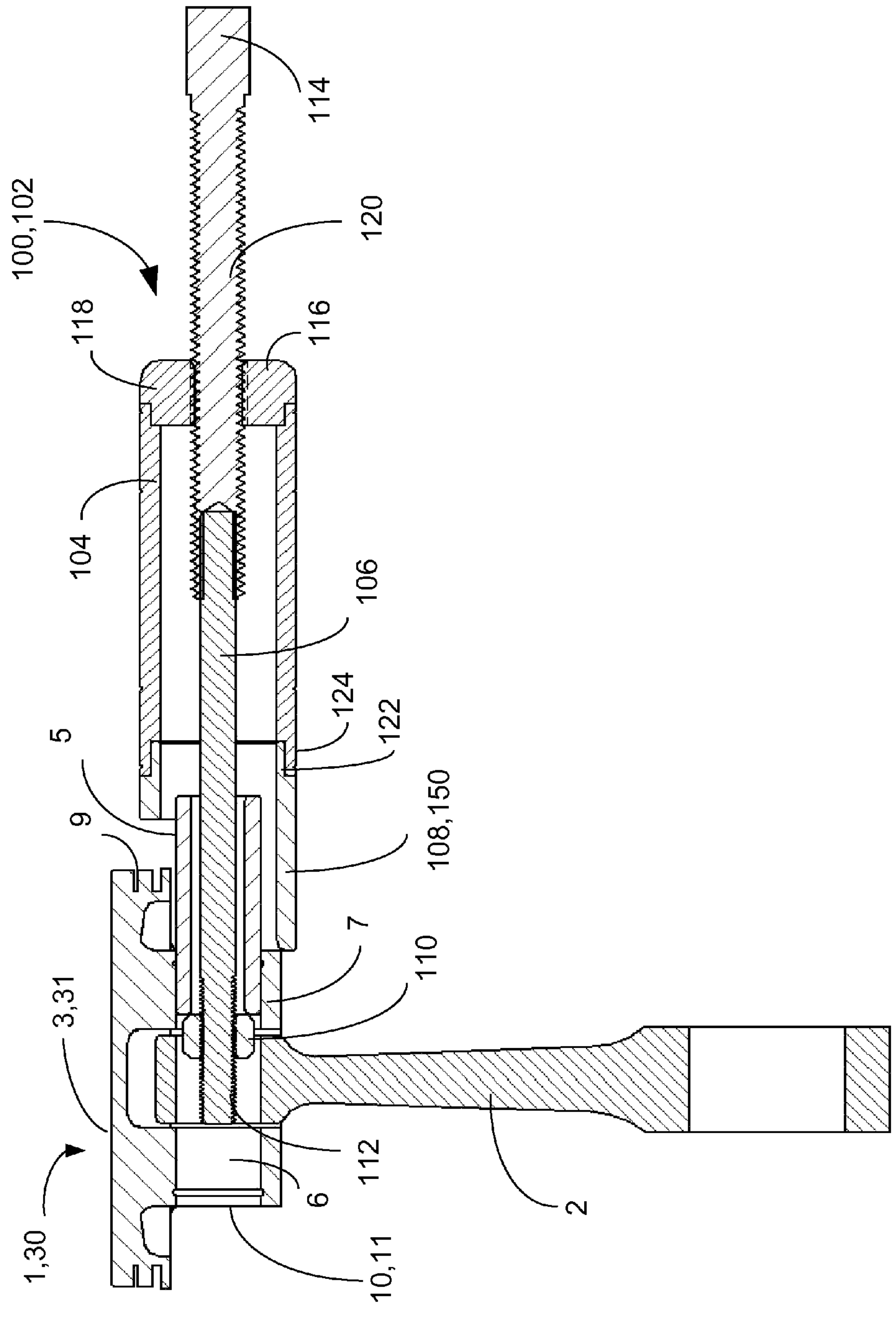
FIG. 10 shows cross-sectional view of the piston puller adaptor tool of the present invention with a short skirt adaptor sleeve, pulling a piston pin.
Figure 11:
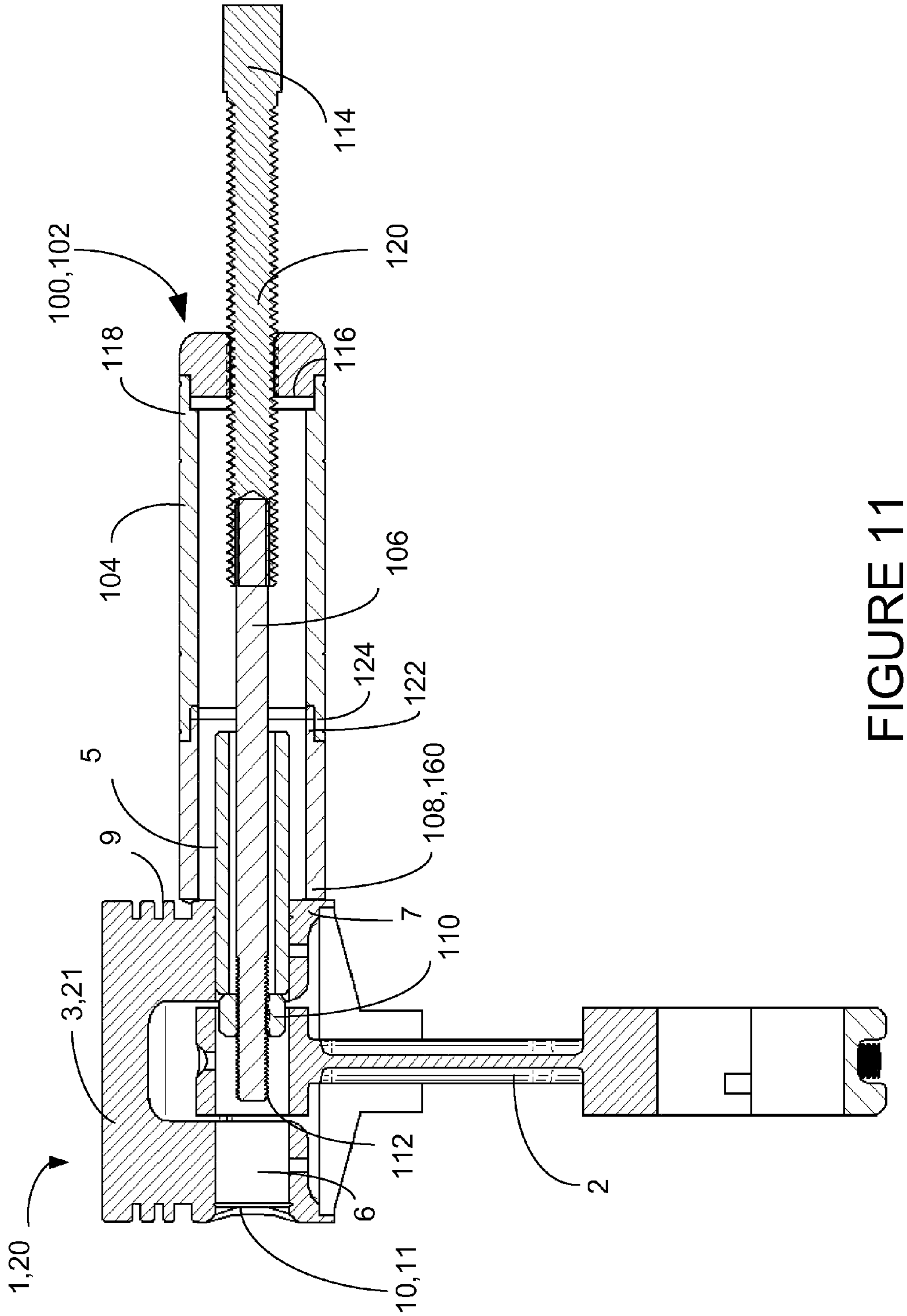
FIG. 11 shows a cross-sectional view of the piston puller adaptor tool of the present invention with a full skirt adaptor sleeve, pulling a piston pin.

Cross-sectional views of the pin puller adaptor tool 100 with short skirt adaptor sleeve 150, and a full skirt adaptor sleeve 160 are shown in FIGS. 10 and 11 respectively, and FIG. 7 shows a detail cross-sectional view, which can be compared with FIG. 6 (prior art).

The replaceable short skirt adaptor sleeve 150 has a unique shape that contacts the piston 3 on the piston pin boss 7. Since the area around the pin boss 7 is very strong and does not touch the cylinder wall, it is a much better place to apply pressure while removing the pin 5.

It is noted that in the present embodiment as shown, the puller screw 106, is actually composed of two smaller screws, which are threaded together. However, this is not to be taken as a limitation, and it is presently preferred that the puller screw 106 be a single unitary member.

The puller screw adaptors 110 come in a variety of sizes to match the sizes of the piston pins 5 and diameters of pin sockets 6.

In practice, when a pin 5 is to be pulled, the clips 10 are removed. The pin puller adaptor tool 100 is assembled with the correct adaptor sleeve 150, 160 in place. Both adaptor sleeves 150, 160 are preferably configured with a male step socket member 122 which fits with a corresponding female step socket member 124 formed in the body 104 of the pin puller adaptor tool 100. The puller screw 106 is inserted through the pin bore 12 of the pin 5, and a puller screw adaptor 110, which is of greater diameter than the pin bore 12, is screwed onto the threads 120 of the puller screw. For a short skirt piston, the sleeve adaptor 150 is positioned abutting the pin boss 7. The nut 114 is rotated, causing the male threads 120 of the upper puller screw 106 to withdrawn through the female threads 118 in the end plate 116. The entire puller screw 106 thus backs up, pulling the puller screw adaptor 110 and the captured pin 5 with it from its socket 6. When the pin 5 is withdrawn, the piston 3 is free to be removed from the rod 2.

For a full skirt piston, the procedure is much the same, with a full skirt adaptor 160 being installed, which then abuts the side of the full skirt piston. It is noted that the contact end of the full skirt adaptor 160 is slightly contoured to securely fit the cylindrical side of the full skirt piston 3. As before, the nut 114 is then rotated to withdraw the puller screw adaptor 110 and the pin 5.

While various embodiments have been described above, it should be understood that they have been presented by way of example only, and not limitation.

INDUSTRIAL APPLICABILITY

The present piston pin puller adaptor tool 100 is well suited generally for removing a variety of piston pins of varying configurations. It accomplishes this by providing two or more adaptors, which interface with the various configurations of pistons better than previous pin pullers.

Pistons currently come in two main varieties, the "full skirt piston" and the "short skirt piston". Short skirt pistons have some portion of the skirt area removed as a means of reducing internal friction in the cylinder and to reduce weight, both of which increase engine performance. Consequently, short skirt pistons are being used more and more commonly.

Prior piston pin pullers are generally configured for the traditional full skirt piston, and are fashioned with a sleeve that has a full circular end-section. This works well with the full skirt piston, where the end of the sleeve easily abuts the side of the skirt portion surrounding the pin hole. However, when this configuration is used with a short skirt piston, most of this skirt area surrounding the pin socket has been removed so that a sleeve with a full circular end-section does not rest evenly on the side of the piston.

Consequently, the full circular end of the pin puller sleeve thus rests mainly on the area including portions of the piston ring lands. This can cause a number of problems, including damage to the rings and ring lands. If the ring lands are damaged the piston cannot be reused.

Also, since the end of the sleeve is supported only at a portion of its circumference, which includes the skirt, but not the piston pin boss, when force is applied to draw the pin, the sleeve tends to pivot at this support point, resulting in a rotational moment, and the pin is not retracted in a straight line, but tends to also pivot. This can cause damage to the pin, and can gall the pin socket as well.

The present pin puller adaptor presents a solution to these problems. The pin puller adaptor tool 100 can have either a short skirt adaptor sleeve 150 or a full skirt adaptor sleeve 160. Both have an adaptor assembly 102, including a body 104, a puller screw 106, and an adaptor sleeve 108, of which there are two varieties, the short skirt adaptor sleeve 150 and the full skirt adaptor sleeve 160. There is also a puller screw adaptor 110, which screws onto threads 112 at the end of the puller screw 106. A nut 114 is provided at the other end of the puller screw 106. This nut 114 is configured to be gripped and turned by a wrench or by hand. The body 104 includes an end plate 116, which includes female threads 118, through which male threads 120 on the puller screw 106 are mated.

The replaceable short skirt adaptor sleeve 150 has a unique shape that contacts the piston 3 on the piston pin boss 7. Since the area around the pin boss 7 is very strong and does not touch the cylinder wall, it is a much better place to apply pressure while removing the pin 5.

The puller screw adaptors 110 come in a variety of sizes to match the sizes of the piston pins 5 and diameters of pin sockets 6.

In practice, when a pin 5 is to be pulled, the clips 10 are removed. The pin puller adaptor tool 100 is assembled with the correct adaptor sleeve 150, 160 in place. Both adaptor sleeves 150, 160 are preferably configured with a male step socket member 122 which fits with a corresponding female step socket member 124 formed in the body 104 of the pin puller adaptor tool 100. The puller screw 106 is inserted through the pin bore 12 of the pin 5, and a puller screw adaptor 110, which is of greater diameter than the pin bore 12, is screwed onto the threads 120 of the puller screw. For a short skirt piston, the sleeve adaptor 150 is positioned abutting the pin boss 7. The nut 114 is rotated, causing the male threads 120 of the upper puller screw 106 to withdrawn through the female threads 118 in the end plate 116. The entire puller screw 106 thus backs up, pulling the puller screw adaptor 110 and the captured pin 5 with it from its socket 6. When the pin 5 is withdrawn, the piston 3 is free to be removed from the rod 2.

For a full skirt piston, the procedure is much the same, with a full skirt adaptor 160 being installed, which then abuts the side of the full skirt piston. It is noted that the contact end of the full skirt adaptor 160 is slightly contoured to securely fit the cylindrical side of the full skirt piston 3. As before, the nut 114 is then rotated to withdraw the puller screw adaptor 110 and the pin 5.

Thus, the present pin puller adaptor tool 100 is usable on many types and sizes of pistons, of both full skirt pistons and short skirt pistons.

For the above, and other, reasons, it is expected that the pin puller adaptor tool 100 of the present invention will have widespread industrial applicability. Therefore, it is expected that the commercial utility of the present invention will be extensive and long lasting.

What is claimed is:

1. A piston pin puller adaptor tool for use with pistons which include a pin boss portion, and ring lands, comprising:

a body;

a puller screw attached to said body; and a plurality of interchangeable adaptor sleeves which attach to said body, wherein said plurality of interchangeable adaptor sleeves includes a short skirt adaptor sleeve and a full skirt adaptor sleeve, wherein said short skirt adaptor sleeve is configured to interface with the contours of a short skirt piston such that said short skirt adaptor sleeve contacts only said pin boss portion of a short skirt piston and does not contact said ring lands when pulling a pin from said piston.

2. The piston pin puller adaptor tool of claim 1, wherein said plurality of interchangeable adaptor sleeves include sleeves of various sizes to fit a variety of sizes of pistons.

3. The piston pin puller adaptor tool of claim 1, further comprising:

a puller screw adaptor, which attaches to said puller screw.

4. The piston pin puller adaptor tool of claim 1, further comprising:

a nut which attaches to said puller screw.

5. The piston pin puller adaptor tool of claim 1, further comprising:

an end plate which attaches to said body.

6. The piston pin puller adaptor tool of claim 1 wherein: said body includes a female socket member.

7. The piston pin puller adaptor tool of claim 6, wherein: said plurality of adaptor sleeves each includes a male socket member, which engages with said female socket member of said body.

* * * * *